Oct. 28, 1941.  C. A. RUESENBERG  2,260,869
FRICTION CLUTCH PLATE
Filed March 29, 1939
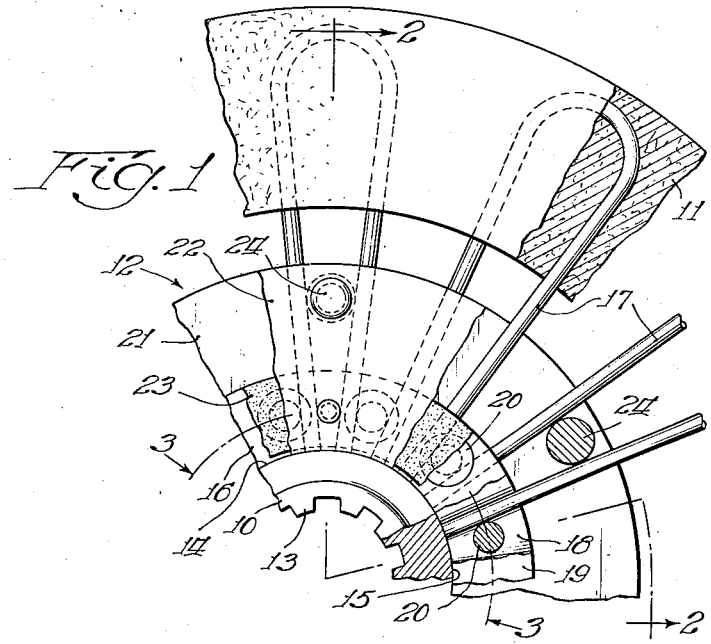
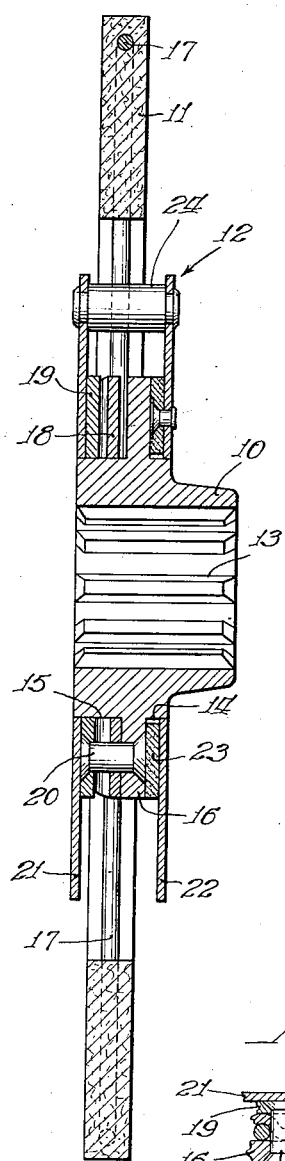
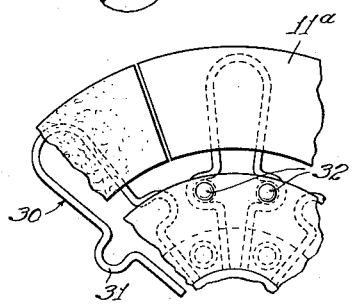
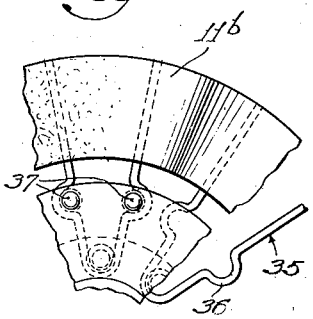
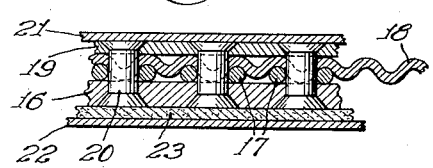
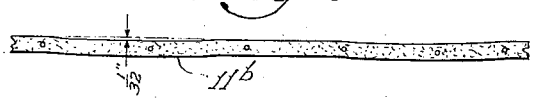
Inventor:
Carl A. Ruesenberg
By Edward C. Gritzbaugh Patented Oct. 28, 1941

2,260,869

UNITED STATES PATENT OFFICE 2,260,869

FRICTION CLUTCH PLATE

Carl A. Ruesenberg, Rockford, Ill., assignor to Borg-Warner Corporation, Chicago, Ill., a corporation of Illinois Application March 29, 1939, Serial No. 264,685

13 Claims. (Cl. 192—68)

This invention relates to improvements in friction clutch plate assemblies and more particularly to friction clutch plate assemblies for engine clutches in corporating a torsion vibration dampener connected between the friction facing and the hub whereby to dampen vibrations otherwise transmitted through the assembly.

It is the object of this invention to provide an improved arrangement of means for connecting the friction facing member to the hub member of a clutch plate assembly.

It is a more specific object to disclose a novel arrangement for incorporating spring steel wire members as the connecting means between the friction facing member and the hub member of a clutch plate assembly for dampening out vibrations incident to torque transmission.

It is still another object to provide in combination with the above, an improved construction of friction facing members and support therefor.

The above and other objects, advantages and uses of my invention will become more apparent from a reading of the following specification and claims taken in connection with the appended drawing which forms a part of this specification and wherein:

Fig. 1 is a partially broken-away face view of an assembly embodying my invention;

Fig. 2 is a vertical section taken on the line 2—2 of Fig. 1;

Fig. 3 is a broken-away section view taken substantially on the line 3—3 of Fig. 1;

Fig. 4 is a broken-away face view corresponding to Fig. 1 but showing a modified arrangement of the spring steel torsion wires, as well as a modified construction of the friction facing;

Fig. 5 is likewise a broken-away face view corresponding to Fig. 1 showing still another modification of the arrangement of spring steel torsion wires, as well as a modified construction of the friction facing;

Fig. 6 is a developed end view of the segmented friction facing member shown in Fig. 4; and Fig. 7 is a developed end view of the weave construction of friction facing member shown in Fig. 5.

Referring in greater detail to Fig. 1, I have illustrated a first preferred embodiment of a clutch plate assembly embodying my invention and comprising generally an internally splined hub 10, an annular main friction facing member 11 and a novel arrangement of means indicated generally at 12 for connecting the main friction facing member to the hub, this means in combination being that to which the present invention is primarily directed.

The hub 10 is formed with the usual coaxial splines 13 providing for the necessary axial movement of the hub but preventing rotation thereof relative to the shaft with which it is adapted to cooperate. The periphery of the hub 10 is formed with shoulders 14, 15 and radially extending flange 16. A plurality of circumferentially disposed radially extending generally U-shaped spring steel wire members 17 are attached adjacent their inner portions to flange 16 and have their outer portions embedded in the friction facing member 11. The attachment of the inner portion of spring steel wires 17 to the hub flange is effected by the provision of a corrugated metal washer 18, the corrugations therein being of a depth slightly less than the diameter of the wire portions to be embraced and being of the proper spacing for cooperation with the peripherally disposed wires. An outside guide and holding washer 19 is disposed in contact with corrugated washer 18 and has passing therethrough a plurality of rivets 20 having the heads thereof countersunk in flange 16 and washer 19. Embracing washer 19 and flange 16 are a pair of disc-shaped plates 21 and 22, the latter carrying auxiliary friction facing 23 for engagement with the face of flange 16 opposite to the face against which wires 17 are clamped by corrugated washer 18. Adjacent the outer periphery of disc plates 21 and 22 there is provided torque reaction pins 24 functioning to hold the disc plates together and also passing between adjacent legs of alternative U-shaped spring steel members 17 for contact thereby when the same are placed under stress by the application of torque, upon the happening of which condition, these pins 24 cause auxiliary friction facing 23 to slide relative to radial flange 16.

Wires 17 are indicated as being embedded in an integral friction facing member 11. This may be accomplished by fabricating the friction facing member about the outer portion of these spring steel wire members. However, it is to be understood that I also contemplate other methods of attaching the friction members to the spring steel wire members. Such alternatives may include the provision of two friction facing members, one placed on each side of the spring steel wire members 17 and attached thereto as by rivets passing between the same in adjacent relation to the wire members and having the head thereof countersunk in a well-known manner.

Referring to Fig. 4, I have shown a slightly modified arrangement of the spring steel wire members referred to generally at 30. I have provided circumferentially oppositely extending embracing portions 31 for embracing the torsion reaction pin 32. In addition in Fig. 4, there is shown an improved arrangement of friction facing members comprising a plurality of independent segments 11a, preferably about 45 degrees in extent. These segments are alternatively staggered to produce an out-of-alignment condition resulting in a cushioning effect when pressure is applied. I have found, for example, that about 1/32 of an inch spacing between the planes of the corresponding faces of adjacent segments produces very satisfactory results.

While I have disclosed this particular form of segmented friction facing members in connection with the particular construction of wire members indicated in Fig. 4, it is to be understood that this construction of facing members is equally adaptable to use with the form of wire members indicated in Figs. 1 and 5.

In Fig. 5 I have shown still another modified arrangement of the spring steel wire torsion members indicated generally at 35. These torsion wire members are likewise generally U-shaped but the open end portions thereof are reversed and connected to the main friction facing member, while the closed ends are attached to the hub flange. Torsion wire members 35 are provided with circumferentially oppositely extending embracing protuberant portion 36 for engaging the torque reaction pins 37. In addition in Fig. 5, there is shown a third alternative form of friction facing member. This friction facing member is formed to have a sinuous or wavy effect for improving its engagement characteristics. This wavy construction is shown to better advantage in Fig. 7. I have found, for example, that a wave having a depth of about 1/32 of an inch at intervals of 45 degrees gives very satisfactory results.

While I have disclosed this wavy construction in connection with the particular form of wire members in Fig. 5, it is to be understood that this construction of friction facing member may be used to equal advantage with the forms of wire members indicated in Figs. 1 and 4.

It will thus be made to appear that I have provided an improved means for connecting the main friction facing member of a clutch plate with the centrally located hub including spring steel torsion dampening wires constituting the sole connection between the main friction facing and the hub. It will be seen further that I have provided this structure in combination with an arrangement of specially cooperating disc weights carrying an auxiliary friction facing and having torque reaction pins for operative contact with the spring steel wires when the same are placed under stress for operating the auxiliary friction facing to thus additionally improve the operation of my clutch plate assembly. In addition I have provided in combination with the above, a special novel construction of friction facing member particularly adapted for cooperation with a spring steel wire connecting means between the hub and friction facing member.

The wire members that I contemplate using in the above structure may be in any of the commonly available sizes and forms such as round, square, octagonal, etc. The diameter and resiliency of the wire will be determined by the required reaction characteristics of the particular installation in which the clutch plate is to function.

I claim:

1. In a clutch plate assembly including a hub member, a main friction facing member and means connecting said friction facing member in supporting relation with respect to said hub member for transmitting torque therebetween, said means being particularly characterized by the provision of spring steel wire members extending radially from said hub to said main friction facing member and attached thereto, and means including an auxiliary friction facing member engaging said hub for resisting relative rotative movement between said hub and said last named means, said means also engaging at least certain of said spring steel wire members at points located radially between said hub and said main friction facing member whereby the application of torque is effective to distort said resilient steel wire members and to thereby move said auxiliary friction facing relative to said hub to thereby improve the operation of said assembly in absorbing the reactions due to said application of torque.

2. In a clutch plate assembly including a hub member, a main friction facing member and means connecting said friction facing member to said hub for transmitting torque therebetween, said means being particularly characterized by the provision of generally U-shaped spring steel wire members disposed circumferentially and extending radially in connected relation between said hub member and said facing member, and means including an auxiliary friction facing member engaging said hub for resisting rotative movement between said hub and said last named means, said last named means including a torque reaction pin extending between certain of the adjacent portions of said wire members whereby said wire members become effective when placed under stress to contact said pin members for moving said auxiliary friction facing relative to said hub to thus improve the operation of said clutch plate assembly in absorbing the reactions instant to the application of torque.

3. In a clutch plate assembly including a hub member, a main friction facing member and means connecting said friction facing member to said hub for transmitting torque therebetween, said means being particularly characterized by the provision of a plurality of generally U-shaped spring steel wire members disposed circumferentially about said hub member, the open end portions of said U-shaped wire members being connected with said friction facing member and means for attaching the closed portions of said U-shaped wire members to said hub, said last named means comprising a radially extending flange formed on said hub and a corrugated washer member for clamping said closed portions of said U-members to said flange and a plurality of rivets extending through said flange and said corrugated washer at circumferentially spaced points for fastening said parts together.

4. In a clutch plate assembly including a hub member, a main friction facing member and means connecting said friction facing member to said hub for transmitting torque therebetween, said means being particularly characterized by the provision of generally U-shaped spring steel wire members disposed circumferentially of said hub and extending radially in connected relation between said hub member and said facing member, said hub being formed with a radially outwardly extending flange, and means including a pair of discs, a plurality of torque reaction pins connecting said guide discs together adjacent the outer peripheries thereof, said pins passing between certain of said wire members for contact thereby when the same are placed under stress, an auxiliary friction facing member carried by one of said discs engaging said hub flange on one face thereof for resisting rotative movement between said hub and said last named means, said wire members being fastened to said flange adjacent the face thereof opposite to said auxiliary friction facing, a corrugated washer member in contact with said wire members adjacent said flange, a plane guide washer in contact with said corrugated washer on one side and guidably engaged by the other of said discs on the other side thereof, a plurality of circumferentially spaced rivets for holding said flange, wire members, corrugated washer and guide washer in assembled relation, when the same are placed under stress whereby to move said auxiliary friction facing relative to said hub to thus improve the operation of said clutch plate assembly.

5. In a clutch plate assembly including a hub member, a main friction facing member and means connecting said friction facing member to said hub for transmitting torque therebetween, said means comprising a plurality of generally U-shaped spring steel wire members disposed circumferentially of said hub and extending radially in connected relation between said hub member and said main friction member, said generally U-shaped spring steel wire member being particularly characterized by the side portions being formed with circumferentially oppositely extending curved portions, and means including torque reaction pins extending within said curved portions for contact thereby when said wire members are placed under a torque load, said means also including an auxiliary friction facing member engaging said hub for resisting rotative movement between said hub and said last named means.

6. In a clutch plate assembly including a hub member and a friction facing member separated from said hub member by an annular space, a plurality of wire spokes of substantially equal resiliency both circumferentially and axially, traversing said space and connecting said hub to said facing member, said spokes functioning to support the facings on the hub, to transmit torque between the facings and hub with torsional cushioning action, and being adapted to yield axially to permit the facings to adjust themselves to the friction faces of the clutch driving members.

7. In a clutch plate assembly including a hub member and a plurality of friction facing segments disposed in annular array around the hub member and separated therefrom by an annular space, a plurality of circumferentially resilient wire spokes traversing said space and connecting said hub to said facing segments for supporting the latter on the hub and for yieldingly transmitting torque therebetween, alternate segments being maintained by said spokes in axially staggered relationship to the intervening segments, said alternate and intervening segments being adapted during clutch engagement to be compressed toward a common plane, such compression being yieldingly resisted by axial flexing of the regions of said spokes which traverse said space.

8. A clutch plate assembly as defined in claim 7, wherein each of such segments is supported by a pair of said spokes, joined together at their outer ends in the form of a U and embedded in the segments.

9. In a clutch plate assembly including a hub member and a friction facing member separated from said hub member by an annular space, a plurality of circumferentially resilient spokes traversing said space and connecting said hub to said facing member for supporting the latter on the hub and yieldingly transmitting torque therebetween, and means for dampening torsional vibration between said hub and facing member, including a frictional braking element carried by the hub, a second frictional braking element coacting with said hub carried friction element, and means on said second braking element extending between adjacent spokes and coacting therewith for transmitting circumferentially flexing movement of said spokes to said second braking element whereby said circumferentially flexing movement is resisted by the braking engagement of said elements.

10. In a clutch plate assembly including a hub member and a friction facing member separated from said hub member by an annular space, a plurality of circumferentially resilient spokes traversing said space and connecting said hub to said facing member for supporting the latter on the hub and for yieldingly transmitting torque therebetween, said hub carrying radially extending annular means in which the inner ends of said spokes are anchored, a pair of braking rings in frictional engagement with said annular means and having regions projecting therebeyond, and tie elements connecting said braking rings together and in frictional engagement with said annular means, said elements extending between adjacent spokes and coacting therewith for transmitting circumferentially flexing movement of said spokes to said rings whereby said circumferentially flexing movement is resisted by the braking engagement of said rings and said annular means.

11. In a clutch plate assembly including a hub member and a friction facing member separated from said hub member by an annular space, said hub member having a radially outwardly extending flange, and a plurality of structurally independent U-shaped facing supporting members each having a web portion supporting the facing and a pair of arms the end regions of which are anchored to said flange.

12. A clutch plate assembly as defined in claim 11, wherein said facing supporting members are adapted to yield axially to cushion the engagement of said facing member between coacting clutch members.

13. In a clutch plate assembly including a hub member and a friction facing member separated from said hub member by an annular space, a plurality of circumferentially resilient wire spokes traversing said space and connecting said hub to said facing member for supporting the latter on the hub and for transmitting torque therebetween, circumferentially spaced regions of the facings being distorted axially with reference to the plane of intervening regions of the facing member, and said spaced and intervening regions being adapted during clutch engagement to be compressed toward a common plane, such compression being yieldingly resisted by axial flexing of the regions of said spokes which traverse said space.

CARL A. RUESENBERG.